United States Patent [19]

Holl

[11] 3,949,549

[45] Apr. 13, 1976

[54] AIRCRAFT GAS TURBINE ENGINE TURBINE BLADE COOLING

[75] Inventor: Raymond Holl, Farnham, England

[73] Assignee: The Secretary of State for Defence in Her Britannic Majesty's Government of the United Kingdom of Great Britain and Northern Ireland, London, England

[22] Filed: Nov. 8, 1974

[21] Appl. No.: 522,275

[30] Foreign Application Priority Data

Nov. 9, 1973  United Kingdom............... 52236/73

[52] U.S. Cl.................. 60/226 R; 60/229; 60/39.23; 60/39.66
[51] Int. Cl.².... F02K 3/02; F02C 3/06; F02C 7/18
[58] Field of Search....... 60/226 R, 229, 224, 39.23, 60/39.07, 39.66; 244/12 B; 415/115, 116; 416/97

[56] References Cited
UNITED STATES PATENTS

| | | | |
|---|---|---|---|
| 2,677,932 | 5/1954 | Forsling................................ | 60/224 |
| 2,783,965 | 3/1957 | Birmann.............................. | 415/115 |
| 2,940,257 | 6/1960 | Eckert et al. ...................... | 60/39.66 |
| 3,263,416 | 8/1966 | Bill et al............................ | 60/226 R |
| 3,482,804 | 12/1969 | Pyptiuk............................. | 244/12 B |
| 3,677,501 | 7/1972 | Denning........................... | 244/12 B |

FOREIGN PATENTS OR APPLICATIONS 1,217,141  5/1966  Germany.......................... 60/226 R

*Primary Examiner*—C. J. Husar
*Assistant Examiner*—Robert E. Garrett
*Attorney, Agent, or Firm*—Cameron, Kerkam, Sutton, Stowell & Stowell

[57] ABSTRACT

An axial flow gas turbine engine, for use in a V/STOL aircraft, of the type having a rotatable nozzle for vectoring the direction of exhausting gas and a tapping for bleeding high pressure compressor outlet gas for use in an aircraft stabilising system, has controllable means for supplying compressor outlet gas to the turbine blades. The same valve is used for controlling supply of gas to the turbine blades and to the stabilising system.

5 Claims, 5 Drawing Figures

U.S. Patent April 13, 1976 3,949,549
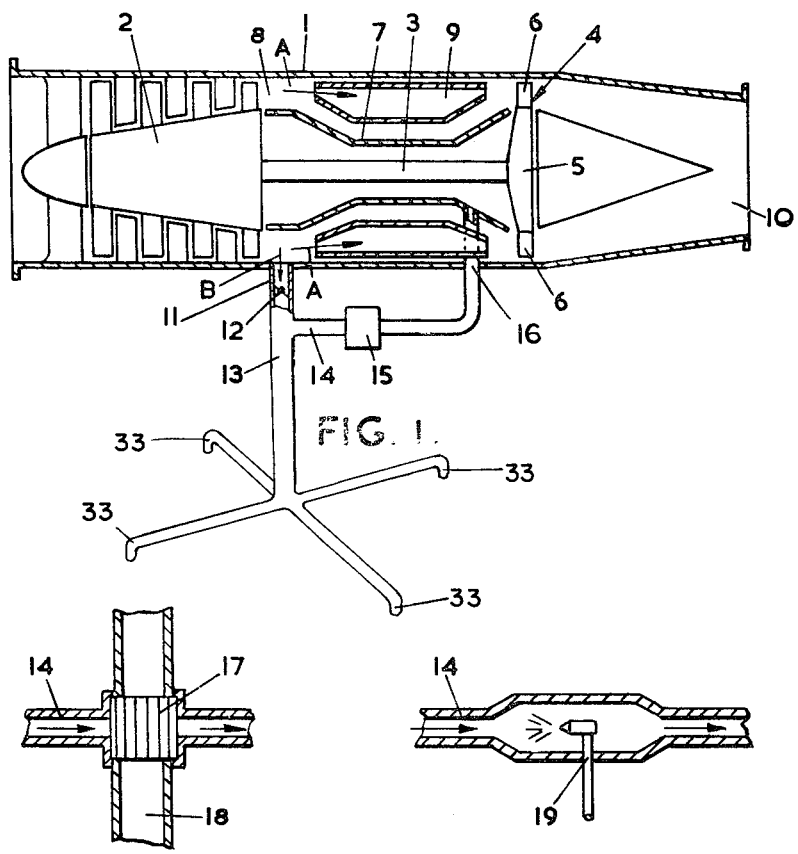
FIG. 1.
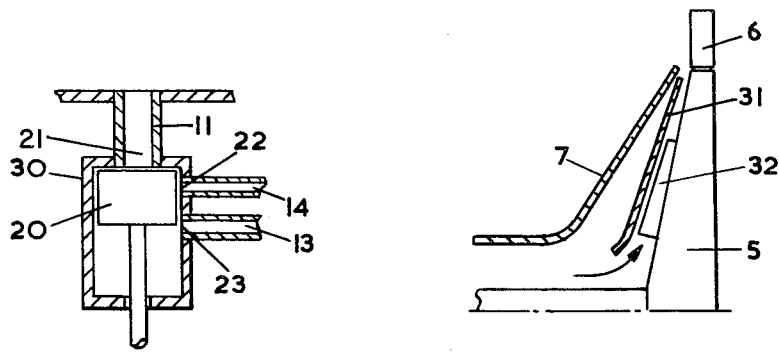
FIG. 2. FIG. 3.
FIG 4. FIG. 5.

AIRCRAFT GAS TURBINE ENGINE TURBINE BLADE COOLING

The present invention relates to aircraft gas turbine engines, and in particular to engines for Vertical and Short Take Off and Landing (V/STOL) aircraft.

Desirable characteristics of an aircraft gas turbine engine are low weight, high maximum thrust, economical fuel consumption and a long safe operating life. The design requirements for these characteristics are in many cases contradictory, and in practice many compromises must be made. The characteristics given most emphasis in a particular engine design will depend on the uses for which that engine is intended.

In a V/Stol aircraft the total engine thrust must be greater than the take off weight of the aircraft. Consequently an important factor in the design of an engine for such an aircraft is the thrust/weight ratio of the engine, which should be as high as possible.

One of the limiting factors in the thrust obtainable from a particular engine design is the temperature at the first row of turbine blades. Apart from the fact that this temperature, which rises as thrust increases, must be kept below a safe level determined by the construction and metallurgical properties of these blades, the safe operating life of the blades is a function of the temperatures at which they are operated. The higher the temperature at which the blades are operated the shorter their life. In assessing the safe life of the blades allowance is made for the times that the engine operates at particular thrust levels, a given engine thrust corresponding to a given turbine blade temperature. The amount of safe operating life of the blades used up when maximum thrust is used for a particular duration is much greater that that for the same duration at cruising thrust.

Many methods of cooling turbine blades have been proposed and used. A method commonly used in engines for V/STOL aircraft is to allow some of the air emerging from the compressor outlet to by-pass the combustion chambers, this air being fed into the vicinity of the turbine blades. In some cases provision is made to inject a coolant such as water into the air at critical engine operating conditions. This method involves the passage of high pressure air to the turbine blades at all engine operating conditions, although cooling is only of significant advantage at high thrust levels. Use of high pressure air in this way reduces the compressor efficiency and results in less economical fuel consumption. At normal engine operating conditions where turbine blade temperatures are well below critical any slight increase in safe blade operating life is unlikely to compensate for the reduction in fuel economy.

The present invention provides means whereby turbine cooling may be selected as required.

According to the present invention an aircraft gas turbine engine has means for tapping high pressure air from the compressor outlet, means for supplying the air to at least one row of turbine blades, and a valve for controlling flow of the air.

Preferably the air is cooled before being supplied to the turbine blades by, for example, passage through a heat exchanger or by injection of a coolant such as water or liquid nitrogen.

Operation of the valve may be controlled by air crew or automatically in response, for example, to one or more engine operating parameters such as a pressure or an engine temperature such as the jet pipe temperature.

It will be appreciated that the incorporation of a valve introduces a possible source of failure and for some types of engine installation might be unacceptable. The invention is therefore most suitable for engines of the type used in V/STOL aircraft which have provision for thrust vectoring and in which high pressure air is tapped from the compressor outlet to provide aircraft stabilisation in flight conditions, such as during a vertical take off or landing, where the aircraft's aerodynamic stabilisers are ineffective. In such an engine a single valve can be used to control both air for stabilisation and air for turbine blade cooling.

Some embodiments of the invention will now be described, by way of example only, with reference to the accompanying diagrammatic drawings, of which:

FIG. 1 is an elevation in section of an engine for a V/STOL aircraft,

FIG. 2 shows means for cooling tapped compressor delivery air,

FIG. 3 shows another means for cooling tapped compressor delivery air,

FIG. 4 is a detail elevation in section of a control valve, and

FIG. 5 is a detail view of part of a turbine rotor.

A gas turbine engine (FIG. 1) for a V/STOL aircraft has an outer casing 1 in which is mounted a compressor, indicated generally at 2, which is connected by a shaft 3 to a turbine 4. The turbine includes a turbine disc 5 on which is mounted a row of turbine blades such as those shown at 6. An inner casing 7 extends from the compressor outlet 8 to the turbine disc 5. In the space defined between the inner casing 7 and the outer casing 1 are a plurality of combustion chambers such as those shown at 9. When the engine is running, air from the compressor outlet 8 passes into the combustion chambers 9, as indicated by the arrows A, where fuel such as paraffin is added and ignited (not shown).

From the combustion chambers 9 combustion gases pass through the turbine blades 6 driving the turbine 4 and, through the shaft 3, the compressor 2. The combustion gases then exhaust through a nozzle 10. To provide a vertical thrust capability the nozzle 10 can be rotated to vector the direction of exhausting of the combustion gases, but for clarity details of rotational mechanisms, which are well known, are omitted.

A pipe 11 leads from adjacent the compressor outlet 8 and air flow therethrough is controlled by a valve, shown for simplicity as a butterfly valve 12. The pipe 11 is bifurcated downstream of the valve 12 into passages 13 and 14. When the valve 12 is open high pressure compressor delivery air passes into the pipe 11 as indicated by the arrow B. This air is made available to aircraft stabilisation jets via the passage 13, flow of air through these jets normally being controlled by valves connected to aircraft controls (not shown). Air also passes via channel 14 through a cooling unit 15 and connecting pipe 16 to within the inner casing 7 whence it is directed outwardly along the turbine disc 5 and over the turbine blades 6 to provide cooling for the blades 6.

The cooling unit 15 may include a heat exchanger 17 (FIG. 2) supplied through a supply duct 18 by a coolant such as, for example, air drawn from atmosphere. Alternatively (FIG. 3) a coolant such as, for example, water or liquid nitrogen may be sprayed directly into airflow through the channel 14 via a nozzle 19.

In the simple arrangement described above with reference to FIG. 1 operation of the valve 12 simultaneously controls supply of high pressure air for aircraft stabilisation and for turbine blade cooling. Flight conditions where aircraft stabilisation is required are associated with high engine thrust, so there is no disadvantage with this arrangement. However, it might be desirable for turbine blade cooling to be available for other flight conditions, such as during climbs and accelerations, when high engine thrust is required.

A valve which allows selection of turbine blade cooling air only (FIG. 4) includes a piston 20 slideable in a cylinder 30. A port 21 in the top of the cylinder 30 connects with the pipe 11 and ports 22, 23 in the sides of the cylinder connect with channels 14, 13 respectively, port 23 being further than port 22 from port 21. In a top position the piston 20 seals port 21 and prevents any airflow. As the piston 20 moves down the cylinder 30 first port 22 and then port 23 are opened, progressively connecting high pressure air first to channel 14 and then to channel 13. The piston 20 can be controlled to connect high pressure air to channel 14 only.

Cooling air for turbine blades has previously been obtained by tapping air from an intermediate stage of a compressor, allowing it to flow within the inner casing 7 and directing it to flow over the turbine blades 6. Also high pressure air from the compressor exit 8 has been bled through the space between the combustion chambers 9 and the inner casing 7, through holes in the casing 7 adjacent to the turbine 4 and on to the turbine blades 6. Means for directing air from within the casing 7 on to the blades 6 are therefore well known to those skilled in the art and will not be described here. However one arrangement which might advantageously be used (FIG. 5) includes a cover plate 31 spaced apart from the turbine disc 5 and a plurality of pressure augmenting fan blades, such as that shown at 32 mounted on the turbine disc 5 and urging cooling air radially outward along the disc 5 on to the turbine blades 6.

The connecting pipe 16 can conveniently be made integral with a bearing support strut in the type of engine having a bearing immediately forward of the turbine 4.

It will be appreciated that whilst the invention has been, for simplicity, described with reference to a single spool (that is one compressor and one turbine) engine, in practice engines for V/STOL aircraft will usually be multi-spool engines.

Many variations of the engine are possible within the scope of the invention. For example alternative types of valve will readily be apparent, and it might in some instances be advantageous to allow for a graduated supply of cooling air for the turbine blades 6. Operation of the valve 20 can be controlled by a member of aircrew, automatically in response to engine operating parameters of pressure or temperature, by throttle position, or, in embodiments where cooling is only required at the same time as air for aircraft stabilisation, by selection of aircraft stabilisation air.

Whilst the embodiment as described with reference to FIG. 1 refers to an engine having a plurality of combustion chambers 9, the invention is also applicable to engines each having a single annular combustion chamber. With such an engine cooling air may be passed to the turbine blades via, for example, turbine entry guide vanes, or may be routed back across the compressor outlet 8 and along the space between the combustion chamber and the inner casing 7.

What I claim is:

1. An axial flow gas turbine engine for use in a V/STOL aircraft having aircraft stabilisation jets comprising, compressor means driveen by turbine means, the turbine means having at least one row of turbine blades mounted on a turbine disc; at least one combustion chamber situated between the compressor means and the turbine means; an exhaust nozzle; a tapping downstream of the compressor means and upstream of the combustion chamber; outlet means for permitting gas from the tapping to flow to the aircraft stabilisation jets; means for supplying gas from the tapping to at least one row of turbine blades; and a valve movable between a closed position in which it prevents flow of gas through the tapping, a first open position in which it allows flow of gas to the turbine blades only, and a second open position in which it allows flow of gas to both the turbine blades and to the aircraft stabilisation jets.

2. A gas turbine engine as claimed in claim 1 having cooling means between the tapping and the turbine blades.

3. A gas turbine engine as claimed in claim 2 wherein the cooling means comprise a heat exchanger.

4. A gas turbine engine as claimed in claim 2 wherein the cooling means comprise a coolant injector.

5. A gas turbine engine as claimed in claim 1 wherein the gas is supplied to the turbine blades radially outwardly from adjacent an axis of rotation of the turbine disc, said turbine disc having a cover plate spaced apart therefrom and a plurality of pressure augmenting fan blades mounted thereon.

* * * * *

UNITED STATES PATENT OFFICE
CERTIFICATE OF CORRECTION

PATENT NO. : 3,949,549
DATED : April 13, 1976
INVENTOR(S) : Raymond Holl

It is certified that error appears in the above-identified patent and that said Letters Patent are hereby corrected as shown below:

Column 2, line 56, after "jets" insert --33--; Column 4, line 22, "driveen" should read --driven--.

Signed and Sealed this

Eighth Day of February 1977

[SEAL]

Attest:

RUTH C. MASON
Attesting Officer

C. MARSHALL DANN
Commissioner of Patents and Trademarks